Dec. 31, 1935.  A. J. FAUSEK ET AL  2,026,028
TORCH
Filed July 29, 1932
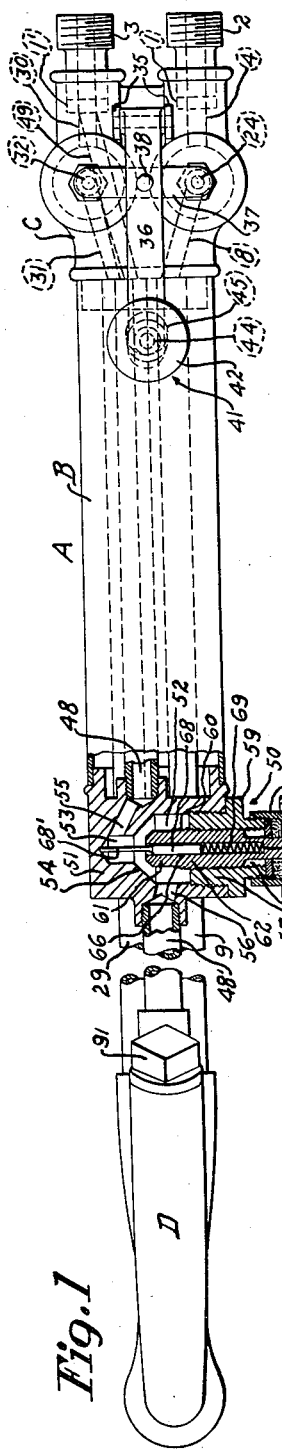
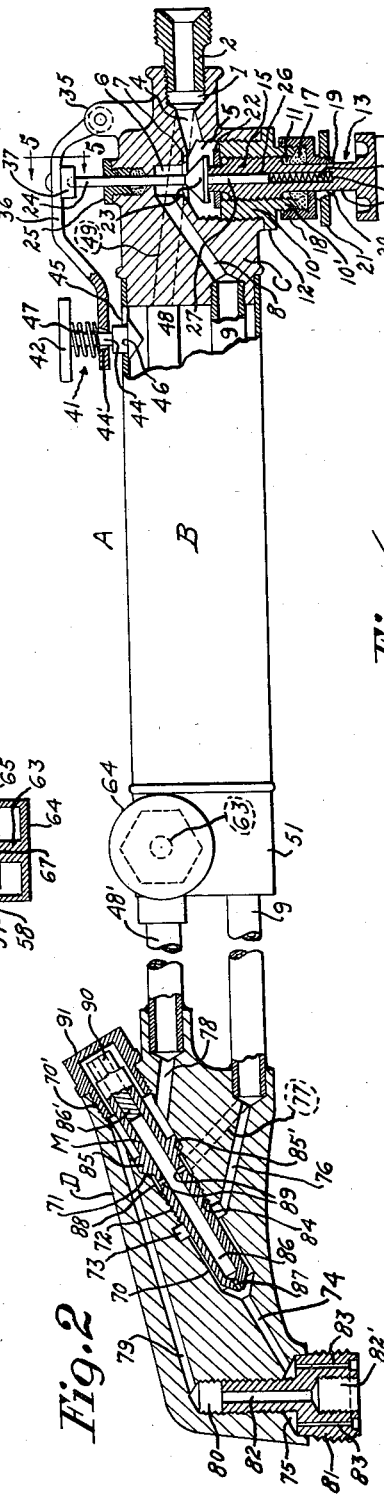
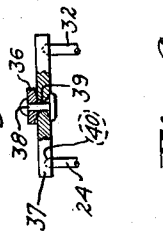
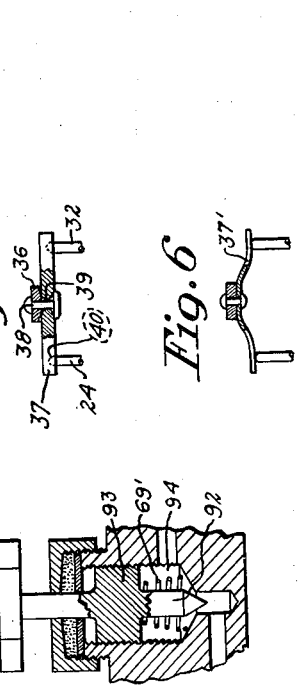
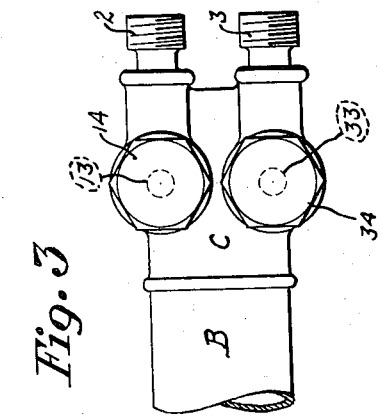
INVENTORS
A. J. FAUSEK
I. F. FAUSEK
BY E. M. Harrington
ATTORNEY Patented Dec. 31, 1935

2,026,028

UNITED STATES PATENT OFFICE 2,026,028

TORCH

Arthur J. Fausek and Irwing F. Fausek, Clayton, Mo.

Application July 29, 1932, Serial No. 626,026

17 Claims. (Cl. 158—27.4)

This invention relates generally to cutting and welding torches of the type which are operated by burning a mixture of oxygen and fuel gas, the predominant object of the invention being to provide a torch of this description which is of such improved construction that it will perform its function in a more efficient and more convenient manner.

Another object of the invention is to provide a torch having improved valve construction which prevents back pressure within the torch from disturbing the settings of the regulating valves.

Another object of the invention is to produce a torch provided with a head which is so constructed that the mixer of the torch, which is associated with the head, is rendered more accessible for manipulation. Also an important feature of the head structure of the torch disclosed herein is the unique arrangement for conducting the oxygen, which forms the cutting jet of the torch, through the head of the torch to the tip thereof.

Still another important object of the invention is to provide a torch with means whereby the valves for regulating the flow of oxygen and fuel gas into the torch are constituted also as quick operating shut-off valves.

Figure 1 is a view partly in plan and partly in horizontal section of the improved torch, parts of the torch being broken away to conserve space.

Figure 2 is a view of the torch shown in Figure 1 but showing same partly in side elevation and partly in longitudinal section, here also parts of the torch being broken away to conserve space.

Figure 3 is a fragmentary inverted plan view of the tail portion of the torch.

Figure 4 illustrates a modified form of one of the valves of the torch.

Figure 5 is a vertical section on line 5—5 of Figure 2.

Figure 6 illustrates a modified form of the structure shown in Figure 5.

In the drawing, wherein are shown for the purpose of illustration, merely, several embodiments of the invention, A designates the improved torch generally, said torch including a handle portion B, a tail piece C, and a head D. The tail piece C is provided at its rearmost end with a pair of screwthreaded cavities I and I' into which suitable nipples 2 and 3 are screwed, these nipples being adapted to receive in connection therewith conduits (not shown) which lead from sources of supply of oxygen and fuel gas.

Leading from the cavity I is a passageway 4 (Figure 2) which communicates with a valve cavity 5 formed in the tail piece of the torch, this valve cavity having an upwardly extended cavity portion 6 of reduced dimensions which is provided with a valve seat 7 at its lower end. Arranged in communication with the cavity portion 6 is a passageway 8 which leads to a tubular conduit 9 which is connected at its opposite ends to the tail piece and head of the torch respectively, said tubular conduit being extended longitudinally through the handle portion B of the torch.

Screwed into the screwthreaded valve cavity 5 is an externally screwthreaded element 10 which is provided with a screwthreaded opening 11 formed therethrough. The element 10 is provided with an annular shoulder 12 which contacts closely with a portion of the tail piece at the lower end of the valve cavity 5. The portion 10' of the element 10 below the annular shoulder 12 is of reduced diameter and is externally screwthreaded as shown in Figure 2.

Arranged in the screwthreaded opening 11 formed in the element 10 is a valve regulating member 13 which is provided at its outer end with a portion 14 that serves to facilitate rotation of the member 13. The member 13 includes a screwthreaded portion 15 which is screwed into the screwthreaded opening 11 of the element 10, a stem portion 16, and the manipulative portion 14 already referred to. Arranged at the lower end of the element 10 and in contact with the stem portion 16 of the valve regulating member 13 is packing material 17 which preferably is in the form of cup leather. This packing material is confined within a cup-shaped element 18 that is screwed on the portion 10' of the element 10, said cup-shaped element being capable of being screwed inwardly on said portion 10' so as to force the packing material into close contact with the lower end of the element 10 and the surface of the stem portion 16 of the valve regulating member 13 and thus provide a fluid-tight joint at the position of the packing material.

The cup-shaped element 18 is provided with a tapered portion 19 having screwthreads formed on the tapered face thereof. The tapered portion 19 is provided with one or more longitudinally extended slits 20 which provide a split construction, and also said tapered portion receives a nut 21 which is provided with a tapered, screwthreaded opening formed therethrough through which the tapered portion 19 is extended. In the use of the torch and when it is desired to lock the valve regulating element 13 against accidental movement, the nut 21 may be screwed inwardly on the tapered portion 19. The effect of this will be that the cooperating tapered screwthreads of the nut and the portion 19 will cause the split portion 19 to grip the stem portion of valve regulating element 13 and lock same in a fixed position. The valve regulating element 13 is provided with a collar 22 which is fixed adjacent to its inner end and serves to contact with the inner end of the element 10 so as to limit outward movement of said valve regulating element when same is rotated. In view of this arrangement the lower portion of the screwthreaded portion of the valve regulating element is prevented from doing injury to the packing material 17.

Disposed in the upper portion of the valve cavity 5 is a valve head 23 which has associated therewith a stem 24 (Figure 2) that passes through a stuffing box 25 associated with the tail piece C of the torch A and extends beyond said stuffing box. The valve head 23 is movable toward and from the valve seat 7 so as to control passage of fluid through the valve cavity 5. Formed longitudinally in the valve regulating element 13 is an opening 26 which is open at the inner end of said element and terminates at a closed end 26' within said valve regulating element. Located within the opening 26 is a stem 27 which contacts with the valve head 23 at one end. The opposite end of the stem 27 contacts with a coil spring 28, said coil spring being interposed between an end of the stem 27 and the closed end of the opening 26. The coil spring 28 tends to move the valve head 23 and the valve regulating element in opposite directions and as a result of this condition any looseness present between the cooperating screwthreads of the element 10 and the screwthreads of the valve regulating element 13 will be taken up by the coil spring as said coil spring forces the valve regulating element outwardly. The stem 27 may be a separate element which merely contacts with the valve head, or, if preferred, said stem may be fixedly associated with said valve head.

The valve mechanism just described is, as already stated, associated with the conduit 9 which is the fuel gas conduit. The torch includes another valve mechanism of like construction and arrangement which is associated with the oxygen conduit 29. Like the fuel gas conduit 9, the oxygen conduit 29 extends through the handle portion of the torch and is connected at its opposite ends to the tail piece C and the head D of the torch A. Also the tail piece C is provided with passageways similar to those designated by the reference characters 4 and 8 which place the nipple 3 in communication with the conduit 29, these passageways being designated by the reference characters 30 and 31 in Figure 1. Passage of fluid from the nipple 3 to the conduit 29 is controlled by a valve mechanism which, as already stated, resembles the valve mechanism already described, the valve mechanism associated with the oxygen conduit including a stem 32 which corresponds to the stem 24 of the valve structure already described, and a valve regulating element 33 which is provided with a manipulative portion 34 which facilitates rotation of the valve regulating element. Also the valve mechanism associated with the oxygen conduit 29 includes a coil spring for taking up looseness between the screwthreads of the valve regulating element thereof and the associated element corresponding to the element 10 already described.

Pivoted to a pair of upstanding ears 35 formed on the tail piece of the torch is an arm 36 which has associated therewith a cross bar 37. The cross bar 37 is loosely fixed to the arm 36, a suitable fastening device 38 being extended through said arm and being passed through an enlarged opening 39 formed in the cross bar. Also the face of the arm with which the cross bar contacts is curved as shown in Figure 5 so as to permit the cross bar to rock with respect to the arm 36. The stems 24 and 32 of the valve mechanisms associated with the fuel gas and oxygen conduits contact with the cross bar 37, said cross bar preferably being provided with depressions 40 which provide seats for the ends of said stems.

At its free end the arm 36 is provided with means 41 for locking said arm in a depressed position, this means comprising a button 42 provided with a stem portion 44 which passes through an opening 44' formed through the arm 36. At the inner end of the stem portion 44 a head is located which is adapted to be passed through an opening 45 formed through the handle portion B of the torch, said head being provided with a shoulder 46 adapted to engage against the inner face of the handle portion and thus retain the arm in its depressed position. Interposed between the button 42 and the arm 36 is a coil spring 47 which forms a yielding connection between the locking means 41 and the arm 36.

Extended longitudinally of the handle portion B of the torch A is an oxygen conduit 48 through which the oxygen that provides the cutting jet of the torch passes. The conduit 48, which includes an extension 48', is connected at its opposite ends to the tail piece and head of the torch, said conduit being placed in communication with the passageway 30 by a passageway 49 shown by dotted lines in Figure 2. At the forward end of the handle portion B of the torch a valve mechanism 50 is provided which controls passage of oxygen through the conduit 48 to the head of the torch.

The valve mechanism referred to comprises an end piece 51 which is fixed in place at the forward end of the handle portion B and which is provided with a valve cavity 52 formed therein. The valve cavity 52 is provided with a portion 53 of reduced diameter at an end of said valve cavity and interposed between the main body portion of the valve cavity and the reduced portion 53 thereof is a valve seat 54. A passageway 55 places the oxygen conduit 48 in communication with the reduced portion 53 of the valve cavity, and a passageway 56 places the main body portion of the valve cavity in communication with the continuation 48' of the oxygen conduit 48.

Screwed in the screwthreaded portion of the valve cavity 52 is an element 57 which is provided with a screwthreaded opening 58 formed therethrough, said element 57 being provided with an annular shoulder 59 that contacts with the portion of the end piece 51 at the outer end of the valve cavity. Arranged within the opening 58 formed through the element 57 is a valve member 60, said valve member comprising a head portion 61, a screwthreaded portion 62, the screwthreads of which cooperate with the screwthreads within the opening 58 of the element 57, a stem portion 63, and a manipulative portion 64 at the outer end of said stem portion which facilitates rotation of said valve member. The outer portion of the element 57 has a stuffing box 65 associated therewith which serves to prevent leakage of fluid at the location of said stuffing box.

The valve member 60 is provided with an opening 66 which is formed longitudinally therein, said opening being open at the inner end of the valve member and being closed at its other end at a point within the valve member as indicated at 67 in Figure 1. Located within the opening 66 is a stem 68 provided with a reduced outwardly extended portion 68', and interposed between the inner end of said stem and the closed end of the opening 66 is a coil spring 69. The outer end of the reduced portion 68' of the stem 68 contacts with a wall portion of the reduced portion 53 of the valve cavity and at all times tends to move the valve member 60 longitudinally and thus serves to take up any looseness between the screwthreads of the valve member and the screwthreads within the opening 58 of the element 57.

The operation of the valve mechanism 50 is perfectly obvious, the manipulative portion 64 being rotated to move the head portion 61 of the valve member 60 toward and from the valve seat 54 in order to control the flow of oxygen to the head of the torch.

Formed in the head D of the torch A is cavity 70 which extends therethrough at an angle, said cavity extending from an elevated point at the rear of the head forwardly and downwardly toward the portion of the head at which the tip of the torch is located. The rear portion of the cavity 70 is screwthreaded as shown at 70' Figure 1, and forwardly of said rear screwthreaded portion the cavity is reduced in diameter and an annular inclined seat 71 is provided at the point where such reduction in diameter occurs. In advance of the annular, inclined seat 71 the wall of the cavity is provided for a short distance with screwthreads 72, and forwardly of the screwthreads 72 an annular groove 73 is formed in the wall of the cavity. At its forward end the cavity 70 communicates with a passageway 74 which leads from said forward end of the cavity to an opening 75 located at the lower, forward end of the head.

Leading from the forward end of the fuel gas conduit 9 to the annular groove 73 of the head D is a passageway 76, and extended from the forward end of the oxygen conduit 29 to the cavity 70 at a point thereof between the annular inclined seat 71 and the screwthreads 72 is a passageway 77. Also a passageway 78 is formed in the head D which leads from the forward end of the extension 48' of the oxygen conduit 48 to the portion of the cavity rearwardly of the annular inclined seat 71, and a continuation 79 of this passageway is present in the head which leads from the portion of the cavity mentioned to the upper end of a screwthreaded opening 80 formed at the forward end of the head. The space 75 already referred to constitutes the lower end of the opening 80, and a tip-receiving element 81 is screwed in said opening. The tip-receiving element 81 is provided with a centrally located passageway 82 having a lower screwthreaded portion 82' of increased diameter, and also said tip-receiving element is provided with a plurality of passageways 83 which communicate with the space 75. The passageways 82—82' and the passageways 83 are open at the lower end of the tip-receiving element 81 and are adapted to cooperate with passageways formed in the tip of the torch, which tip is not shown in the drawing.

Extended into the cavity 70 is a mixer M which includes a portion having screwthreads 84 which cooperate with the screwthreads 72 formed within the cavity. The mixer also includes an enlarged portion 85 having an inclined face 85' which contacts closely with the annular inclined seat located within the cavity. Formed longitudinally through the mixer M is a passageway 86 which is closed at its rear end by a plug 86', the forward end of the mixer being tapered and a restricted discharge orifice 87 which communicates with the passageway 86 being formed through said forward end of the mixer. At the point where the passageway 77 communicates with the cavity 70 the mixer is of slightly reduced diameter so as to provide an annular space 88, and formed through the wall of the mixer is a plurality of passageways 89 which place said annular space in communication with the central passageway 86 of the mixer.

An extremely important feature of the invention is that the rear end of the mixer M is provided with a noncircular portion 90 which extends beyond the rear end of the cavity 70 so that a wrench may be conveniently applied to the mixer for adjusting same. This noncircular portion of the mixer is enclosed within a removable element 91 which is screwed in the screwthreaded rear end portion of the cavity 70. The mixer M illustrated in the drawing is a low pressure mixer but it is obvious that high or medium pressure mixers of slightly different construction may be used with the torch.

In the use of the torch the valve regulating elements 13 and 33 are moved outwardly by unscrewing same and the arm 36 is depressed and so locked by the locking means 41. This will force the associated valve heads into contact with the inner ends of the valve regulating elements. The valve regulating elements are then adjusted by rotation to move the valve heads to the adjustment which will provide for the desired flow of gas and oxygen, the cross bar 37 rocking as the respective stems 24 are moved longitudinally and the coil spring 47 being contracted and expanded in accordance with the adjustment of the valve heads, and said coil spring always keeping the valve heads in close contact with the inner ends of the valve regulating elements. When the desired adjustments of the valve heads have been attained the valve adjusting elements 13 and 33 are locked against accidental movement as has already been explained in connection with the description of the means of which the nut 10' forms a part. The fuel gas and oxygen controlled by the valves at the tail piece of the torch then flow to the head of the torch in proper proportion, said fuel gas and oxygen being mixed at the forward end of the mixer and the combustible mixture passing to the tip of the torch by way of the passageway 74, space 75, and passageways 83.

The improved torch may be used either as a welding torch or a cutting torch and when used as a welding torch the valve 56 is closed, fuel gas and oxygen passing only through the conduits 9 and 29 as already explained. However, when the torch is to be used as a cutting torch the valve 56 is manipulated to provide the proper flow of oxygen through the conduit 48 and extension 48'. This oxygen provides the cutting jet of the torch and it flows across the upper portion of the cavity 70 and flows to the central passageway of the tip by way of the passageway 79, opening 80 and passageways 82 and 82'.

It is obvious that the valves at the tail piece of the torch serve the dual functions of serving as regulating valves for the fuel gas and oxygen that provide the preheating flame of the torch and as quick operating shut-off valves. These valves are simultaneously operated by the arm 36 and may be operated as shut-off valves which may be repeatedly operated without disturbing the adjustments of said valves.

In Figure 4 we illustrate a modification of the valve 50 illustrated in Figure 1. In Figure 4 a coil spring 69' is employed which surrounds the valve stem 92 and this coil spring serves to take up looseness between the screwthreads of the portion 93 of the valve and the screwthreads within the valve cavity 94.

In Figure 6 we illustrate a modification of the structure shown in Figure 5, the cross bar 37' of Figure 6 being in the form of a leaf spring which will yield as the valves are adjusted.

An extremely important feature of the invention resides in providing the valves of the torch with coil springs for taking up looseness between cooperating screwthreads of parts of the valve structures. This arrangement is important because heretofore the looseness referred to permitted the valve settings to be disturbed when back pressure developed within torches, such back pressure moving the valve heads because of the looseness mentioned and permitting a greater amount of fuel gas or oxygen to pass through the valve than was intended. By providing the valves with coil springs the effect of back pressure is overcome and, if the valve heads should be moved the coil springs will return said valve heads to their original positions immediately as the moving force is relieved.

We claim:

1. In combination with a torch of the class described, a valve including a valve element, a valve seat with respect to which said valve element is movable, screwthreaded means for regulating said valve element relative to said valve seat, and resilient means for taking up looseness at the screwthreads of said regulating means, said resilient means being in direct contact with said screw-threaded regulating means and tending to move said screw-threaded regulating means in a direction away from said valve seat.

2. In combination with a torch of the class described, a valve including a valve element, a valve seat with respect to which said valve element is movable, screwthreaded means for regulating said valve element relative to said valve seat, and resilient means in the form of a coil spring for taking up looseness at the screwthreads of said regulating means, said resilient means being in direct contact with said screwthreaded regulating means and tending to move said screw-threaded regulating means in a direction away from said valve seat.

3. In combination with a torch of the class described, a valve including a valve element, a valve seat with respect to which said valve element is movable, screwthreaded means for regulating said valve element relative to said valve seat, said screwthreaded means having an opening formed therein, a coil spring arranged within said opening, and a member contacting with said coil spring and with a part of the valve structure distinct from said regulating means whereby looseness at the screwthreads of said regulating means is taken up.

4. In combination with a torch of the class described, a valve including a valve head, a valve seat with respect to which said valve head is movable, screwthreaded means for regulating said valve head relative to said valve seat, said screwthreaded means having an opening formed longitudinally therein, a coil spring arranged within said opening, and a member arranged in contact with said coil spring and with said valve head whereby looseness at the screwthreads of said regulating means is taken up.

5. In combination with a torch of the class described, a valve including a valve head, a valve seat with respect to which said valve head is movable, screwthreaded means for regulating said valve head relative to said valve seat, said screwthreaded means having an opening formed longitudinally therein, a coil spring arranged within said opening, and a member arranged in contact with said coil spring and with said valve head whereby said regulating means is moved in a direction away from said valve seat so that looseness at the screwthreads of said regulating means is taken up.

6. In combination with a torch of the class described, a valve including a valve head, a valve seat with respect to which said valve head is movable, screwthreaded means for regulating said valve head relative to said valve seat, said screwthreaded means having an opening formed longitudinally therein, a coil spring arranged within said opening, a member arranged in contact with said coil spring and with a part of the valve structure distinct from said regulating means whereby looseness at the screwthreads of said regulating means is taken up, and means for locking said regulating means against accidental movement.

7. In combination with a torch of the class described, a valve including a valve head, a valve seat with respect to which said valve head is movable, screwthreaded means for regulating said valve head relative to said valve seat, an element associated with said torch and having a screwthreaded opening in which said screwthreaded regulating means is screwed, said screwthreaded regulating means having an opening formed therein, a coil spring arranged within said opening, a member arranged in contact with said coil spring and with a part of the valve structure distinct from said regulating means whereby looseness at the screwthreads of said regulating means is taken up, clamping means associated with said element for locking said regulating means against accidental movement, and means for causing said clamping means to grip a portion of said regulating means.

8. A torch of the class described including a head, a handle portion, a tail piece, conduits leading from said tail piece to said head through which fluid passes, a plurality of valves at said tail piece for regulating the passage of fluid through said conduits, means extended into said tail piece for regulating the operation of said valves, and means for simultaneously moving said valves to open or closed positions.

9. A torch of the class described including a head, a handle portion, a tail piece, conduits leading from said tail piece to said head through which fluid passes, a plurality of valves at said tail piece for regulating the passage of fluid through said conduits, means extended into said tail piece for regulating the operation of said valves, and means comprising a pivoted arm for simultaneously moving said valves to open or closed positions.

10. A torch of the class described including a head, a handle portion, a tail piece, conduits leading from said tail piece to said head through which fluid passes, a plurality of valves at said tail piece for regulating the passage of fluid through said conduits, means extended into said tail piece for regulating the operation of said valves, means comprising a pivoted arm for simultaneously moving said valves to open or closed positions, and means for locking said pivoted arm in a position where said valves are maintained in an open condition.

11. A torch of the class described including a head, a handle portion, a tail piece, conduits leading from said tail piece to said head through which fluid passes, a plurality of valves at said tail piece for regulating the passage of fluid through said conduits, each of said valves including a valve head, a valve seat with respect to which said valve head is movable, means extended into said tail piece for regulating said valve head relative to said valve seat, and a stem extended from said valve head, and means cooperating with the stems of said valves for simultaneously moving the valve heads of said plurality of valves to open and closed positions.

12. A torch of the class described including a head, a handle portion, a tail piece, conduits leading from said tail piece to said head through which fluid passes, a plurality of valves at said tail piece for regulating the passage of fluid through said conduits, each of said valves including a valve head, a valve seat with respect to which said valve head is movable, means for regulating said valve head relative to said valve seat, and a stem extended from said valve head, and means cooperating with the stems of said valves for simultaneously moving the valve heads of said plurality of valves to open and closed positions, said means comprising a pivoted arm, and a cross member yieldably attached to said pivoted arm and with which the stems associated with the valve heads of said valves contact.

13. A torch of the class described including a head, a handle portion, a tail piece, conduits leading from said tail piece to said head through which fluid passes, a plurality of valves at said tail piece for regulating the passage of fluid through said conduits, each of said valves including a valve head, a valve seat with respect to which said valve head is movable, means for regulating said valve head relative to said valve seat, and a stem extended from said valve head, and means cooperating with the stems of said valves for simultaneously moving the valve heads of said plurality of valves to open and closed positions, said means comprising a pivoted arm, a cross member yieldably attached to said pivoted arm and with which the stems associated with the valve heads of said valves contact, and means for locking said pivoted arm in a position where said valves are maintained in an open condition.

14. A torch of the class described including a head, a handle portion, a tail piece, conduits leading from said tail piece to said head through which fluid passes, a plurality of valves at said tail piece for regulating the passage of fluid through said conduits, each of said valves including a valve head, a valve seat with respect to which said valve head is movable, means for regulating said valve head relative to said valve seat, and a stem extended from said valve head, and means cooperating with the stems of said valves for simultaneously moving the valve heads of said plurality of valves to open and closed positions, said means comprising a pivoted arm, a cross member yieldably attached to said pivoted arm and with which the stems associated with the valve heads of said valves contact, and means for locking said pivoted arm in a position where said valves are maintained in an open condition, the last mentioned means including a spring which permits movement of said pivoted arm with respect to said locking means.

15. A torch of the class described comprising a head, means for conducting fluid to said head, a mixing chamber formed in said head, a mixer arranged in said mixing chamber, a part of said mixer being exposed at the rear end of said head and said mixer being extended forwardly and downwardly within said head, said exposed part of said mixer having a tool receiving portion adapted to facilitate removal of said mixer, and a hollow closure element associated with said head and arranged to embrace the tool-receiving portion of said mixer.

16. A torch of the class described comprising a head, means for conducting fluid to said head, a mixing chamber formed in said head, a mixer arranged in said mixing chamber, a part of said mixer being extended beyond said mixing chamber at the rear of said head and said mixer being extended forwardly and downwardly within said head, said rearwardly extended part of said mixer having a tool receiving portion adapted to facilitate removal of said mixer, and a hollow closure element associated with said head and arranged to embrace the rearwardly extended part of said mixer.

17. A cutting torch including a head, a handle portion, a tail piece, conduits leading from said tail piece to said head through which fluid passes, a plurality of valves at the tail piece for regulating the passage of fluid through said conduits, means for regulating the operation of said valves, a mixing chamber formed in said head to which said conduits lead, an oxygen conduit for conducting oxygen to said head, a valve for controlling passage of oxygen through said oxygen conduit, means for simultaneously actuating said plurality of valves at the tail piece of the torch, said oxygen conduit being arranged to discharge oxygen transversely through said mixing chamber, and a mixer within said mixing chamber provided with means for maintaining said oxygen separate from the fluid discharged into the mixing chamber by the first mentioned conduits.

ARTHUR J. FAUSEK.
IRWING F. FAUSEK.